(12) United States Patent
Dausch et al.

(10) Patent No.: US 8,198,974 B2
(45) Date of Patent: Jun. 12, 2012

(54) FLEXIBLE ELECTROSTATIC ACTUATOR

(75) Inventors: David E. Dausch, Raleigh, NC (US);
Scott H. Goodwin, Hillsborough, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 675 days.

(21) Appl. No.: 11/578,556

(22) PCT Filed: Apr. 25, 2005

(86) PCT No.: PCT/US2005/014104
§ 371 (c)(1),
(2), (4) Date: Dec. 20, 2007

(87) PCT Pub. No.: WO2005/104717
PCT Pub. Date: Nov. 10, 2005

(65) Prior Publication Data
US 2008/0123171 A1   May 29, 2008

Related U.S. Application Data

(60) Provisional application No. 60/564,594, filed on Apr. 23, 2004, provisional application No. 60/564,573, filed on Apr. 23, 2004, provisional application No. 60/564,580, filed on Apr. 23, 2004, provisional application No. 60/564,571, filed on Apr. 23, 2004, provisional application No. 60/564,572, filed on Apr. 23, 2004.

(51) Int. Cl.
*H01H 71/18* (2006.01)
*H01H 71/16* (2006.01)
*H01H 51/22* (2006.01)

(52) U.S. Cl. .......... 337/139; 337/123; 337/111; 337/36; 335/78

(58) Field of Classification Search ................ 361/687; 337/139, 123, 111, 36; 335/78
See application file for complete search history.

(56) References Cited

U.S. PATENT DOCUMENTS

| | | | | |
|---|---|---|---|---|
| 3,772,537 | A | * 11/1973 | Clifford et al. | 310/309 |
| 3,989,357 | A | * 11/1976 | Kalt | 359/231 |
| 4,266,339 | A | * 5/1981 | Kalt | 29/829 |
| 5,463,233 | A | * 10/1995 | Norling | 257/254 |

(Continued)

FOREIGN PATENT DOCUMENTS

CA   2 300 956 A1   3/1999

(Continued)

OTHER PUBLICATIONS

Japanese Office Action dated Jan. 11, 2011 in corresponding Japanese Application No. 2007-509717 (with English Translation).

(Continued)

*Primary Examiner* — Bradley Thomas
(74) *Attorney, Agent, or Firm* — Oblon, Spivak, McClelland, Maier & Neustadt, L.L.P.

(57) ABSTRACT

An electrostatic actuator having a base including a first electrode and a flexible membrane including at least two material layers of different materials in contact with each other. At least one of the material layers includes a second electrode electrically isolated from the first electrode. The flexible membrane includes a fixed end connected to the base and a free end opposite the fixed end and spaced apart from the base. The second electrode has at least first and second portions separated by a third portion and in combination defining a first and second step provided in a vicinity of the fixed end.

27 Claims, 10 Drawing Sheets

U.S. PATENT DOCUMENTS

| | | | |
|---|---|---|---|
| 5,619,177 A * | 4/1997 | Johnson et al. | 337/140 |
| 5,629,565 A * | 5/1997 | Schlaak et al. | 257/780 |
| 5,638,946 A * | 6/1997 | Zavracky | 200/181 |
| 5,781,331 A | 7/1998 | Carr et al. | |
| 5,835,256 A | 11/1998 | Huibers | |
| 6,046,659 A * | 4/2000 | Loo et al. | 333/262 |
| 6,057,520 A | 5/2000 | Goodwin-Johansson | |
| 6,127,908 A * | 10/2000 | Bozler et al. | 333/246 |
| 6,184,065 B1 * | 2/2001 | Smith et al. | 438/117 |
| 6,191,671 B1 | 2/2001 | Schlaak et al. | |
| 6,229,683 B1 | 5/2001 | Goodwin-Johansson | |
| 6,229,684 B1 * | 5/2001 | Cowen et al. | 361/278 |
| 6,236,491 B1 | 5/2001 | Goodwin-Johansson | |
| 6,373,682 B1 | 4/2002 | Goodwin-Johansson | |
| 6,396,620 B1 | 5/2002 | Goodwin-Johansson | |
| 6,467,879 B1 * | 10/2002 | Kubby et al. | 347/54 |
| 6,485,273 B1 * | 11/2002 | Goodwin-Johansson | 417/410.2 |
| 6,590,267 B1 | 7/2003 | Goodwin-Johansson | |
| 6,625,004 B1 * | 9/2003 | Musolf et al. | 361/278 |
| 6,646,525 B2 * | 11/2003 | Bozler et al. | 333/246 |
| 6,731,492 B2 | 5/2004 | Goodwin-Johansson | |
| 6,744,338 B2 * | 6/2004 | Nikitin | 333/262 |
| 6,979,893 B2 * | 12/2005 | Dunphy et al. | 257/682 |
| 7,325,302 B2 * | 2/2008 | Mathieu et al. | 29/874 |
| 7,545,622 B2 * | 6/2009 | Morris et al. | 361/290 |
| 2003/0058069 A1 * | 3/2003 | Schwartz et al. | 335/78 |
| 2003/0071330 A1 * | 4/2003 | Romano et al. | 257/669 |
| 2004/0012061 A1 * | 1/2004 | Reid et al. | 257/415 |
| 2004/0108195 A1 * | 6/2004 | D'Amico et al. | 200/600 |
| 2005/0012975 A1 * | 1/2005 | George et al. | 359/223 |
| 2005/0104693 A1 * | 5/2005 | Youngner | 335/78 |
| 2006/0066434 A1 * | 3/2006 | Richards et al. | 337/14 |

FOREIGN PATENT DOCUMENTS

| | | |
|---|---|---|
| EP | 0 608 816 A2 | 8/1994 |
| JP | 6-223698 A | 8/1994 |
| JP | 2001-514434 A | 9/2001 |
| JP | 2003-501274 A | 1/2003 |
| JP | 2003/218292 A | 7/2003 |
| JP | 2004-508952 A | 3/2004 |
| WO | WO 00/73839 A1 | 12/2000 |
| WO | WO 02/22492 A2 | 3/2002 |

OTHER PUBLICATIONS

Office Action issued May 20, 2011, in Chinese Patent Application No. 200910005912.7 (submitting English translation only).

Office Action issued Aug. 24, 2011, in European Patent Application No. 05 738 825.8.

Office Action issued in Chinese Patent Application No. 200910005912.7 mailed on Jan. 5, 2012 (English translation only).

* cited by examiner

BACKGROUND ART

FLEXIBLE ELECTROSTATIC ACTUATOR

CROSS-REFERENCE TO RELATED APPLICATIONS

This application is related to and claims priority to U.S. Provisional Application Ser. No. 60/564,594, filed on Apr. 23, 2004, entitled "Releasing Structures," the entire contents of which are incorporated herein by reference. This application is related to and claims priority to U.S. Provisional Application Ser. No. 60/564,580, filed on Apr. 23, 2004, entitled "Electrostatic Valve with Non-Wetting Layer," the entire contents of which are incorporated herein by reference. This application is related to and claims priority to U.S. Provisional Application Ser. No. 60/564,573, filed on Apr. 23, 2004, entitled "Flow Control for Higher Operating Pressures," the entire contents of which are incorporated herein by reference. This application is related to and claims priority to U.S. Provisional Application Ser. No. 60/564,572, filed on Apr. 23, 2004, entitled "Strong and Flexible Valve Closing for Flexible Electrostatic Film," the entire contents of which are incorporated herein by reference. This application is related to and claims priority to U.S. Provisional Application Ser. No. 60/564,571, filed on Apr. 23, 2004, entitled "Higher Operating Voltages for Flexible Film Actuators," the entire contents of which are incorporated herein by reference. This application is related to U.S. Pat. No. 6,236,491, the entire contents of which are incorporated herein by reference. This application is related to U.S. Pat. No. 6,456,420, the entire contents of which are incorporated herein by reference.

BACKGROUND OF THE INVENTION

1. Field of the Invention

The present invention relates to microelectromechanical actuator structures, and more particularly to electrostatically activated micromachined actuator structures.

2. Description of the Related Art

Advances in thin film technology have enabled the development of sophisticated integrated circuits. Such semiconductor technology has also been leveraged to create Micro Electro Mechanical System (MEMS) structures. Many different varieties of MEMS devices have been created, including microsensors, microgears, micromotors, and other microengineered devices. For example, microcantilevers have been used to apply rotational mechanical force to rotate micromachined springs and gears. Electromagnetic fields have been used to drive micromotors. Piezoelectric forces have been used to controllably move micromachined structures. Controlled thermal expansion of actuators or other MEMS components has been used to create forces for driving microdevices.

Flexible composite electrostatic actuators typically include a flexible composite fabricated from flexible electrode and insulators. The flexible composite is attached to and can deflect under an electrostatic force toward a substrate including a fixed electrode. An insulator is disposed between the flexible composite and the substrate to avoid shorting of the flexible electrode to the fixed electrode. By applying a voltage between the flexible electrode and the fixed electrode, the flexible composite is pulled to the substrate by electrostatic attraction. Without voltage, typically stress in the flexible composite curls the flexible composite away from the substrate. Applications for flexible composite actuators include gas or fluid valves, optical shutters, radio frequency phase shifters, choppers for infrared detectors, microactuators, electrical switches, and variable radio frequency capacitors A conventional actuator of U.S. Pat. No. 6,236,491 is shown in FIG. 1. The actuator therein includes a fixed composite 130 and a flexible composite 50. The fixed composite 130 includes a substrate 10, a fixed electrode 20, and a substrate insulator 30. A flexible composite 50 including a flexible electrode 40 overlies the fixed composite 130, and includes a fixed portion 70, a medial portion 80, and a distal portion 100. A fixed portion 70 is substantially affixed to the underlying substrate 10 or intermediate layers. A medial portion 80 extends from the fixed portion 70 and is held in position without the application of electrostatic force, thereby defining an air gap 120 between the underlying planar surface and the medial portion 80.

Both the medial portion 80 and the distal portion 100 are released from the underlying fixed composite 130 upon completion of the actuator. The distal portion 100 is free to move in operation, curling away and altering the separation from the underlying planar surface. Once the flexible composite 50 bends the medial portion 80 can curl toward, curl away, or remain at a constant separation from the underlying planar surface.

In cross section, the flexible composite 50 can include multiple layers including at least one electrode layer 40 and can include a biasing layer to mechanically reinforce a section of the flexible composite toward the fixed portion 70. The number of layers, thickness of layers, arrangement of layers, and choice of materials used may be selected to cause the flexible composite to curl toward, curl away, or remain parallel to the underlying microelectronic substrate electrode.

The flexible composite 50 typically include a polymer film 60, a flexible electrode 40, and another polymer film 62. Different thermal coefficients of expansion between the layers of the flexible composite 50 mechanically bias the medial portion 80 and distal portion 100 to curl away from the underlying surface 32 after removal of a release layer 34 used in fabrication of the structure. The distal portion 100 can curl with either a variable or constant radius of curvature.

Because the medial portion is constructed similarly to the distal portion, the differential thermal expansion coefficients between the electrode 40 and polymer film(s), tend to curl the medial portion. However, additional layers of polymer film, metals, or other materials may optionally be applied over the second layer of polymer film to serve as a biasing control structure to counteract the tendency to curl and hold the medial portion in position once the release layer has been removed. Alternatively, materials may be applied with intrinsic stresses to enhance the tendency to curl and increase the distance between the flexible composite and the substrate surface.

Despite the sophistication of conventional actuators, a number of problems affect the reliability and performance of the actuators. These problems detailed below are addressed in the various embodiments of the present invention.

SUMMARY OF THE INVENTION

One object of the present invention is to provide an actuator that closes under reduced operating voltage conditions that is less likely to cause dielectric breakdown in the insulating materials of the actuator.

Another object of the present invention is to provide an actuator whose flexible membrane is structurally reinforced to maintain closure against a pressurized fluid.

Another object of the present invention is to provide an actuator whose closure voltage for a given applied fluid pressure is reduced and therefore less likely cause dielectric breakdown in the insulating materials of the actuator.

Still another object of the present invention is to reduce adherence of foreign materials to the flexible membrane of the actuator and therefore provide more predictable movement of the flexible membrane under electrical bias.

Still another object of the present invention is to reduce regions of local high electric field in the actuator and therefore less likely cause dielectric breakdown in the insulating materials of the actuator.

Various of these and other objects are provided for in the embodiments of the present invention.

In one exemplary embodiment, there is provided an electrostatic actuator having a base including a first electrode, and having a flexible membrane including at least two material layers of different materials in contact with each other. At least one of the material layers includes a second electrode electrically isolated from the first electrode. The flexible membrane includes a fixed end connected to the base and a free end opposite the fixed end. In the flexible membrane, the second electrode has at least first and second portions separated by a third portion and in combination defining a step provided in a vicinity of the fixed end. The first step is closest to the fixed end and separated by a shorter distance from the first electrode than the second portion.

In another exemplary embodiment, there is provided an electrostatic actuator having a base including a first electrode, and having a flexible membrane including at least two material layers of different materials in contact with each other. At least one of the material layers includes a second electrode electrically isolated from the first electrode. The flexible membrane includes a fixed end connected to the base and a free end opposite the fixed end. As a part of the flexible membrane, the stiffening member is disposed on the flexible membrane away from the fixed end.

In another exemplary embodiment, there is provided an electrostatic actuator having a base including a first electrode, and having a flexible membrane including at least two material layers of different materials in contact with each other. At least one of the material layers includes a second electrode electrically isolated from the first electrode. The flexible membrane includes a fixed end connected to the base and a free end opposite the fixed end. The electrostatic actuator includes an elongated orifice extending through the base and extending along a direction away from the fixed end.

In another exemplary embodiment, there is provided an electrostatic actuator having a base including a first electrode, and having a flexible membrane including at least two material layers of different materials in contact with each other. At least one of the material layers includes a second electrode electrically isolated from the first electrode. The flexible membrane includes a fixed end connected to the base and a free end opposite the fixed end. The first electrode of the base extends past an end of the second electrode of the flexible membrane in a direction defined toward the fixed end.

In another exemplary embodiment, there is provided an electrostatic actuator having a base including a first electrode, and having a flexible membrane including at least two material layers of different materials in contact with each other. At least one of the material layers includes a second electrode electrically isolated from the first electrode. The flexible membrane includes a fixed end connected to the base and a free end opposite the fixed end. The flexible membrane includes a peripheral or side cut out configured to communicate to an interior of the flexible membrane.

In another exemplary embodiment, there is provided an electrostatic actuator having a base including a first electrode, and having a flexible membrane including at least two material layers of different materials in contact with each other. At least one of the material layers includes a second electrode electrically isolated from the first electrode. The flexible membrane includes a fixed end connected to the base and a free end opposite the fixed end. The actuator has a non-wetting compound disposed on at least one of an upper surface of the flexible membrane, a lower surface of the flexible membrane, and an upper surface of the base.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
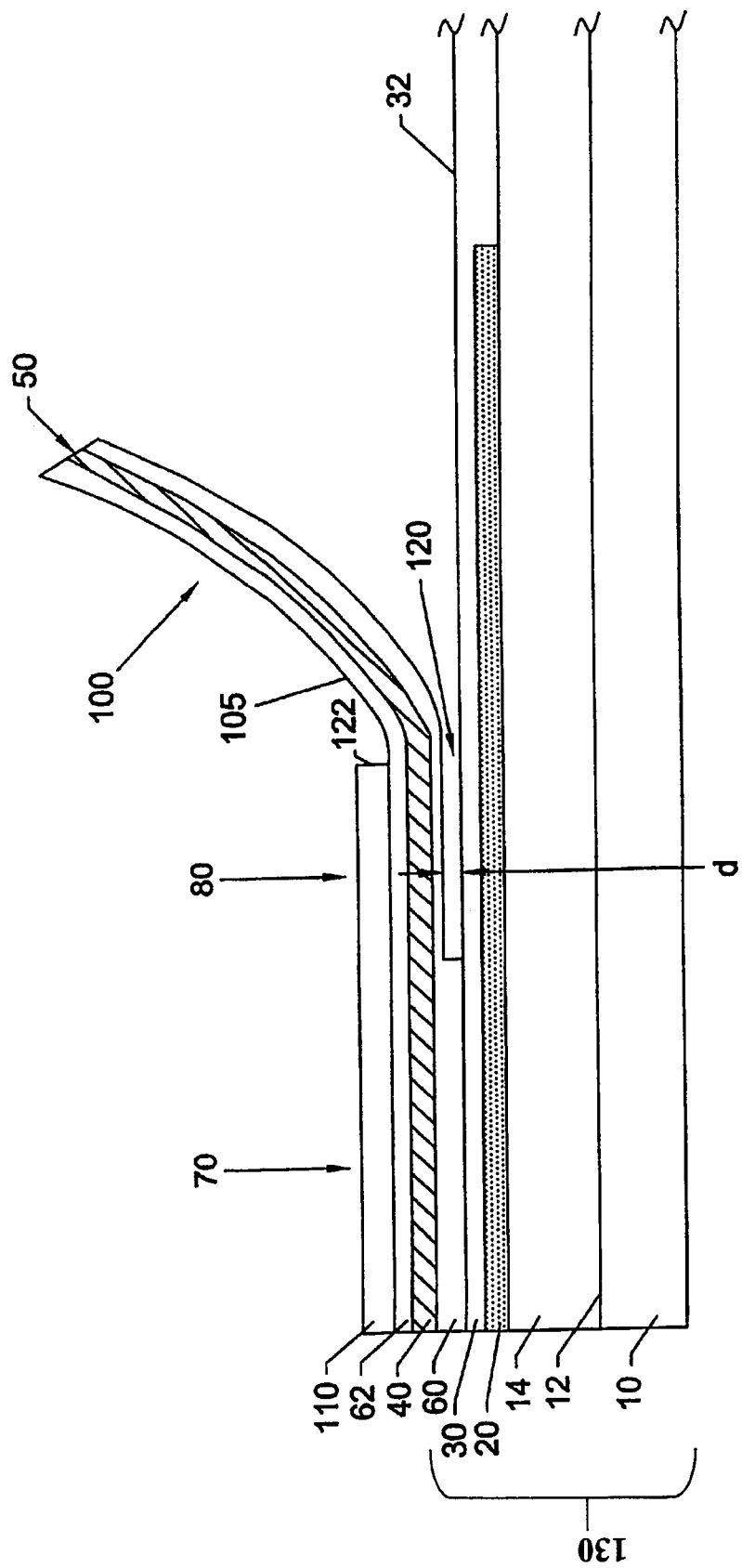
FIG. 1 is a schematic depicting a side view of a conventional micromechanical actuator.

Referring now to the drawings, wherein like reference numerals designate identical or corresponding parts throughout the several views, various aspects of the present invention are explained via the following illustrative embodiments of the present invention.

Figure 2:
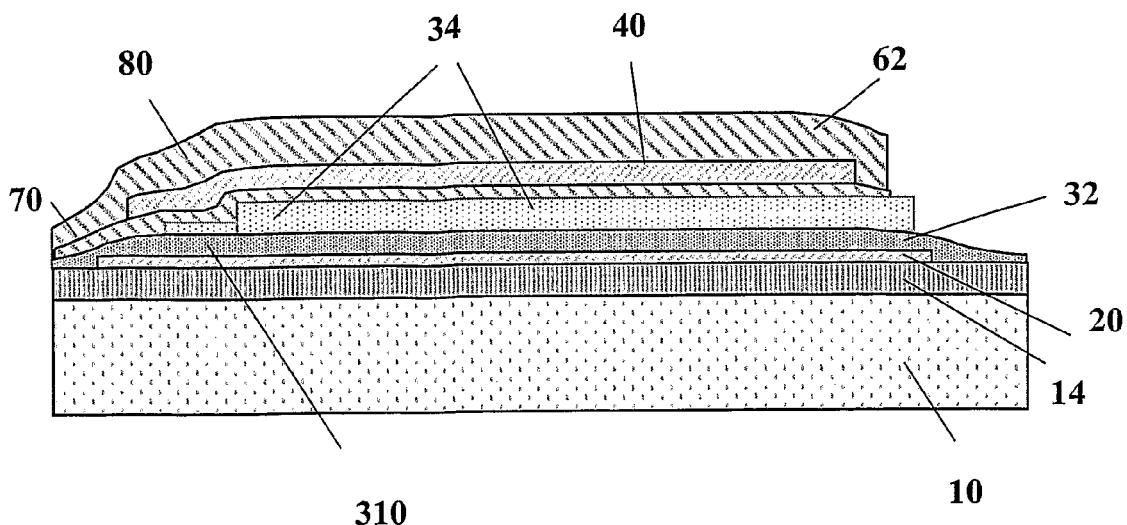
FIG. 2 is a schematic depicting a side view of a micromechanical actuator according to the present invention that utilizes a step reduction to reduce a gap between a flexible membrane and a fixed substrate layer.

The "operating voltage" of an actuator typically refers to electric potential applied between fixed and flexible electrodes such as, for example, electrodes 20, 40 in FIG. 2 to close an actuator and is typically defined by the "initial pull-down voltage", which refers to the electric potential that is applied to initiate a closure. More particularly, the initial "pull-down" voltage draws the flexible composite 50 into contact with the fixed composite 130. After initial contact, a lower voltage can be used to progressively pull the remainder of the flexible composite 50 into contact with the fixed composite 130, thereby closing the actuator in for example a zipper-like manner.

In one embodiment of the present invention, as shown in FIG. 2, the operating voltage of an actuator can be reduced by narrowing at least a portion of gap 120 between the electrodes 20 and 40 away from the distal portion 100. In this embodiment, the release layer 34 (shown for purposes of illustration and absent in the working actuator) is deposited and patterned resulting in a replication of the shape of the top surface of the release layer in the shape of the underlying surface of the flexible composite 50. As noted above, removal of the release layer permits the flexible composite 50 to curl away from the fixed electrode 20, forming under no bias an exit angle as seen in FIG. 1 between the medial and distal portions 80, 100 of the flexible composite 50.

The resulting gap 120 between the fixed and flexible composites 130, 50, which is determined by the thickness of the release layer 34, affects the initial pull-down voltage used to begin pull down of the flexible membrane 50. A release layer can typically be 2000 Å thick. For tightly-curled flexible composites 50, an initial pull-down voltage of 200 V may be required. The resulting electric field of 10 MV/cm exceeds the breakdown strength of most dielectric materials. A thinner release layer 34 decreases the gap 120 between the flexible and fixed composites 50, 130, thereby reducing the initial pull-down voltage. However, an overly thin release layer (e.g., much less than 1000 Å) can cause difficulty in release of the actuator due to discontinuities or defects in the release layer which would prevent release of some portions of the flexible composite.

In this embodiment of the present invention, the thickness of the release layer 34 is reduced at a distance from the fixed portion 70, as shown illustratively in FIG. 2. As such, the resulting flexible composite 50 has electrode 40 separated from the substrate electrode 20 by a decreased amount in those regions closer to the fixed portion 70, thereby forming a graduated gap 120. Thus, the smaller gap is formed near the fixed portion 70 resulting in a lower initial pull-down voltage, while a majority of the release layer 34 is thick enough to ensure a proper release etch.

In one illustrative example, the majority of the release layer 34 can be 1000-2000 Å thick, while in the graduated portion of the release layer 34 can be 100 to 1000 Å. To form the graduated portion, the release layer 34 can be deposited in stages; greater etching of the release layer can be performed near the fixed portion 70 of the flexible composite 50, and/or gray-scale lithography can be employed providing a more "analog" reduction in thickness. While FIG. 2 illustrates only two steps, multiple steps, e.g., 2000 Å, 1000 Å, 500 Å, and then 250 Å can be formed to minimize the area of the thinned portion of the release layer while reducing the gap to its smallest possible distance directly adjacent to the fixed portion for minimum pull-down voltage. For example, for a flexible film actuator with 2000 Å thick release layer and closing voltage of 72 V, reducing the release layer thickness to 500 Å near the fixed portion reduces the closing voltage to 64 V, a reduction of approximately 10%. For an actuator with release layer of 2000 Å and voltage of 310 V, reducing the release layer to 500 Å thick reduces the voltage to 245 V, a reduction of approximately 20%.

One method for forming the steps would be a blanket deposition of the release film, followed by multiple lithographic maskings, each masking followed by a partial etch of the exposed release film. Alternatively if the release film is being deposited with liftoff technology, multiple maskings and depositions could be done to build up the release layer in stages.

Gray-level lithography is a third way of building an analog (i.e., a smoother) variation in thickness of the release layer. Gray-level lithography involves creating a photomask that has either variations in the opaqueness of the masking film or a very fine pattern of opaque and clear areas that can not be resolved one for one in the resist film. In either case, the exposure dose is chosen to only partially develop away the thickness of the resist under the gray-level regions of the mask since the amount of UV radiation illuminating the resist undergoes a transition laterally across the surface of the wafer from full exposure where there is no opaque material (with complete removal of the resist during develop) to no exposure where the mask is totally opaque (and no removal of resist). Thus the thickness of the resist goes through a gradual transition instead of the near-vertical step shown in FIG. 2. For instance, in one embodiment of the present invention, a sloped transition can be transferred into the underlying release layer with an RIE step that etches both photoresist and the release layer at roughly the same rates.

Figure 3:
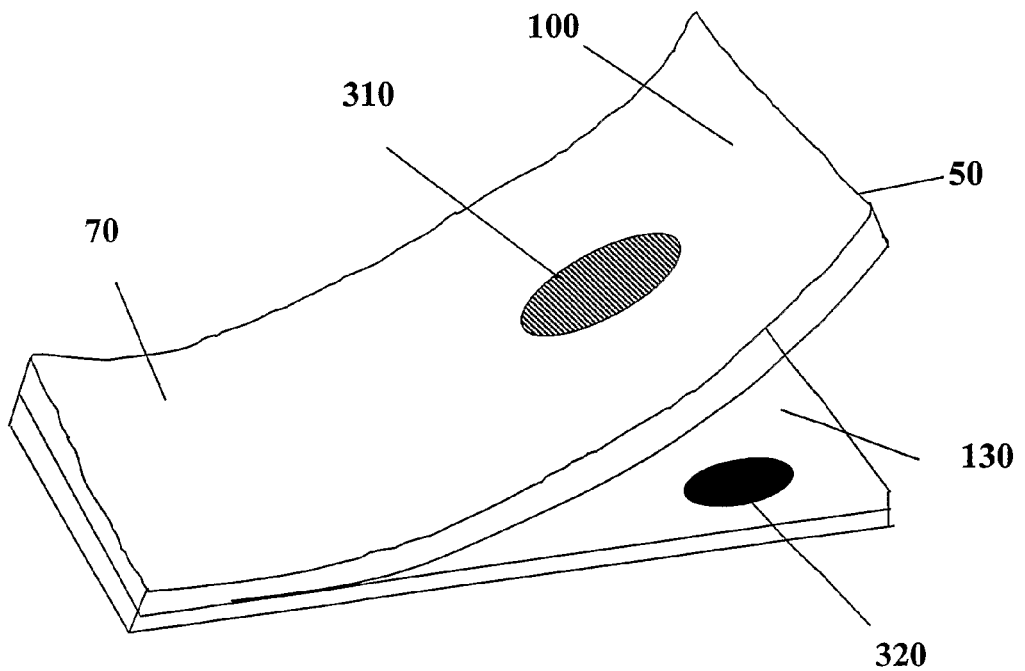
FIG. 3 is a schematic depicting a perspective view of a micromechanical actuator according to the present invention that includes a stiffening mechanism.

In another embodiment of the present invention, as shown illustratively in FIG. 3, an actuator is provided that acts as a gas or fluid valve and holds closed against greater pressures without significantly increasing operating voltage. "Pressure" refers to the force applied against the underside surface of the flexible composite 50 by a gas or liquid, which flows through an orifice 320 in the fixed composite 130 toward the underside surface of the flexible composite 50 and impinges on that underside surface.

As shown in FIG. 3, the flexible composite 50 in this embodiment includes an orifice cap 310, which may be formed from a layer of a stiffening material arranged on or within the flexible composite 50. The stiffening material may be formed be depositing a metal layer and patterning by liftoff technology, or by depositing a layer of polymer, oxide or nitride and patterning by chemical or plasma etching. The stiffening material can be a metal such as for example Cr, Au, Au alloys, or Al, although other metals and non-metals including for example oxides, nitrides or polyimide can be used according to the present invention. In addition to forming the orifice cap 310, a layer of stiffening material in the medial portion affects the exit angle of the flexible composite when no bias is applied. If the stiffening material is conductive, a voltage may be applied to the orifice cap 310 to generate or increase the electrostatic attraction between the flexible and fixed composites 50, 130. The conductive stiffening material can be electrically connected to the flexible electrode in the flexible composite through an etched via. In certain embodiments, the flexible electrode may be discontinuous over the orifice in the fixed composite. By electrically connecting the conductive stiffening layer, additional electrostatic force is provided around the fixed composite orifice.

Regardless of whether a voltage is applied to the orifice cap 310, the orifice cap 310 provides a more robust seal by having increased mechanical strength about the orifice 320. The increased mechanical strength of the cap allows a larger area of the surrounding electrodes' electrostatic force to assist in holding the flexible composite 50 against the fixed composite 130. Multiple orifices and corresponding orifice caps may be included within a single actuator. Preferably the area containing the orifice cap is greater than the area of the orifice hole. If the area of the orifice caps is smaller than the area of the orifice holes, the overall stiffness of the flexible composite 50 will only increase by a small amount, and increased pressure capability will not be achieved. While shown as orifice caps, stiffening members could be applied to other regions of the flexible composite 50 besides those regions adjacent the orifices. Variables for controlling the stiffness of the orifice caps and the flexible composite 50 include the choice of stiffness material, the mechanical properties (e.g., Young's modulus) of the stiffness material, the thickness of the material, the shape of the orifice cap 310, the amount of overlap between the orifice cap and the orifice opening, and the placement of the orifice cap 310 on (top or bottom surface) or within the flexible composite. The preferable range of area ratios between the metal stiffener and the orifice opening is from 1.4 to 9, although other ranges are suitable for the present invention. Preferred range of thicknesses for the stiffeners (i.e., orifice caps) is from 0.5 µm to 1.5 µm, although other ranges are suitable for the present invention. One preferred metal is gold having a chromium adhesion layer. Suitable orifice cap shapes include circular caps or rows of parallel bars that are parallel to the actuator hinge (width direction). It has been shown that for valve actuators with 70 micron orifice size, applying stiffening caps increases the pressure holding capability by 20 to 50%.

Figure 4A:
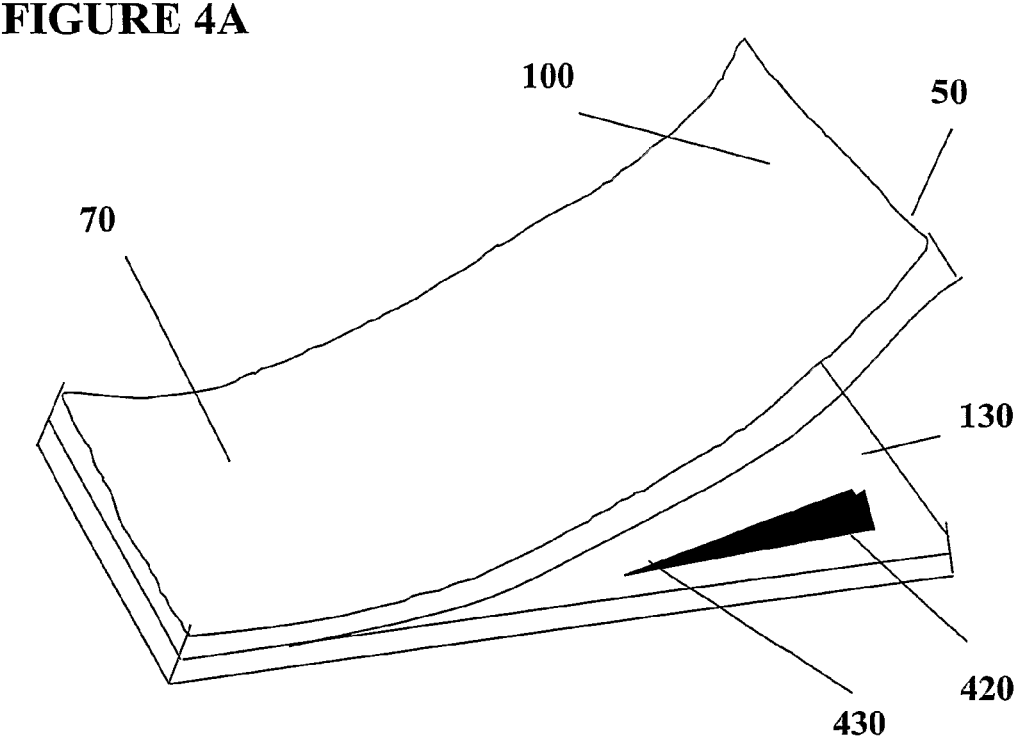
FIG. 4A is a schematic depicting a perspective view of a micromechanical actuator according to the present invention that includes a tapered valve opening.
Figure 4B:
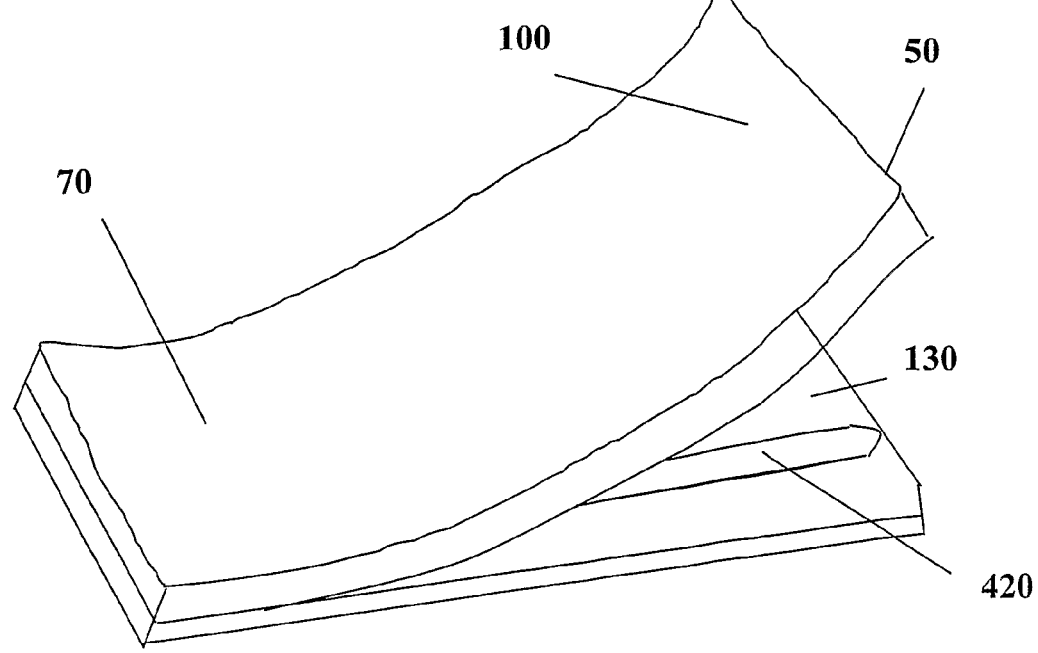
FIG. 4B is a schematic depicting a perspective view of a micromechanical actuator according to the present invention that includes an elongated valve opening.
Figure 5:
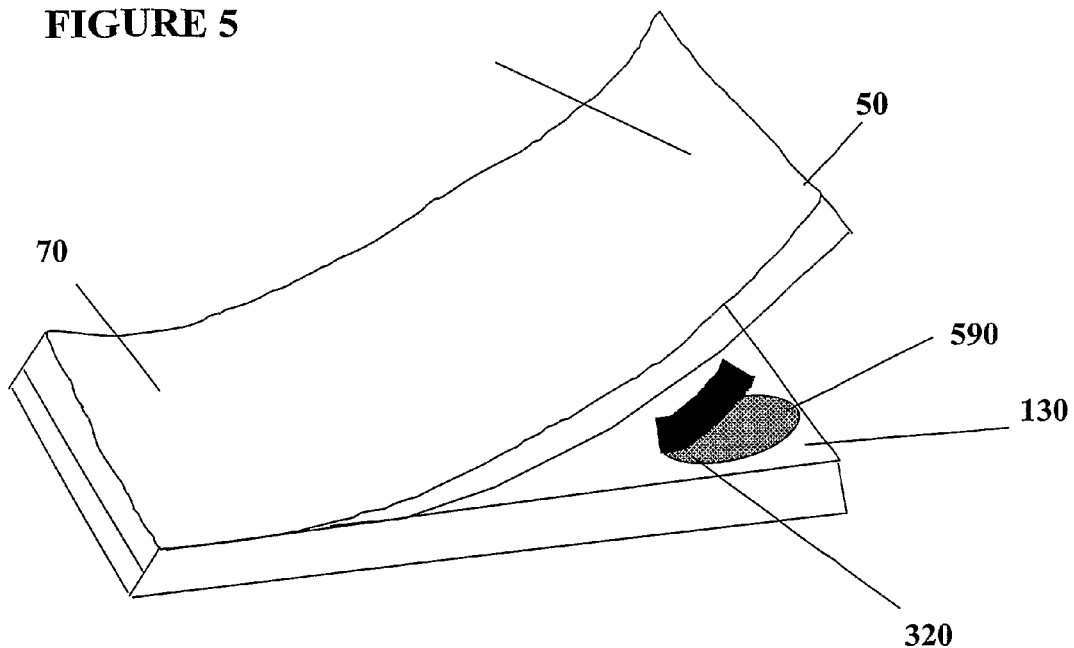
FIG. 5 is a schematic depicting a perspective view of a micromechanical actuator according to the present invention that includes a deflector over the valve opening.

Another embodiment of the present invention, as shown in FIGS. 4A, 4B, and 5, reduces the operating voltage for closure of the flexible membrane by directing the flow of gas or liquid toward the more distal portions of the flexible composite 50 (i.e., the free end) away from the fixed portion 70. A flow of gas or liquid through an orifice exerts pressure against the underside of a flexible composite 50, thereby inhibiting the flexible composite 50 from approaching the fixed composite 130.

According to the present invention, the actuator of FIG. 4A can direct the fluid to more distal portions by modifying the shape of the orifice 420. A tapered orifice such as for example the triangular orifice 420 shown in FIG. 4A has a single tip 430 disposed toward the fixed portion 70 of the flexible composite 50. By directing the fluid passing through the orifice away from the fixed portion 70 of the flexible composite, the orifice 420 facilitates the initial closure of the actuator. As the actuator closes, the overall area of flexible composite 50 struck by the flow of gas or liquid is reduced, and the electrostatic force increases with the reduced separation, thereby facilitating the closure of the flexible composite 50 over the remainder of the orifice 420. Preferably, but not necessarily, the dimension of the triangular orifice 420 perpendicular to the fixed end of the flexible composite should be at least twice the dimension of the triangle parallel to this direction and more preferably 3 times, thus foaming an elongated triangular shape as shown in FIG. 4A.

According to alternate embodiments, the flow through the orifice can be evenly distributed across the under surface of the flexible composite. As shown in FIG. 4B, this is accomplished by forming an oblong shaped orifice in the fixed composite. Distributing the flow would serve a similar function as deflecting the flow (as described above and shown in FIG. 4), as distributing the flow would reduce the amount of flow that is concentrated in areas closer to the medial portion of the flexible composite. Greater flow would be concentrated closer to the medial portion with a circular orifice in the center of the fixed composite under the flexible composite. This greater concentrated flow would reduce the capability of the flexible composite to close over the fixed composite surface, especially at the position of the circular orifice. Distributed flow provided by the oblong orifice would increase the closing capability over the orifice. In addition, an elongated orifice with the same area as a circular orifice will have a smaller orifice distance that the flexible composite will need to span at the position of the orifice (i.e., the circular orifice is wider at the orifice position, the oblong orifice is narrower). This smaller distance translates to increased flexible electrode area in contact with the fixed composite at the orifice position which increases the electrostatic force in holding the flexible composite 50 against the fixed composite 130. The width of the oblong hole would be substantially less than the width of a typical circular hole in order to provide the same area for flow as a circular hole but with longer length. In certain embodiments, the length of the oblong hole could be approximately 30 to 90% of the length of the flexible composite.

In another embodiment of the present invention, the actuator of FIG. 5 employs a deflector 590 to deflect the flow of gas or liquid toward the more distal portions of the flexible composite 50. In this manner, the deflector 590 directs the fluid flow toward the more distal or free portions of the flexible composite 50, thereby facilitating closure of the actuator in the manner described in the above example. The deflector 590 may deflect some of the gas or liquid entirely away from the flexible composite 50; and thereby reduce the force of the inhibiting pressure from the fluid flow away from a normal direction to the underlying surface of the flexible composite 50.

Figure 6:
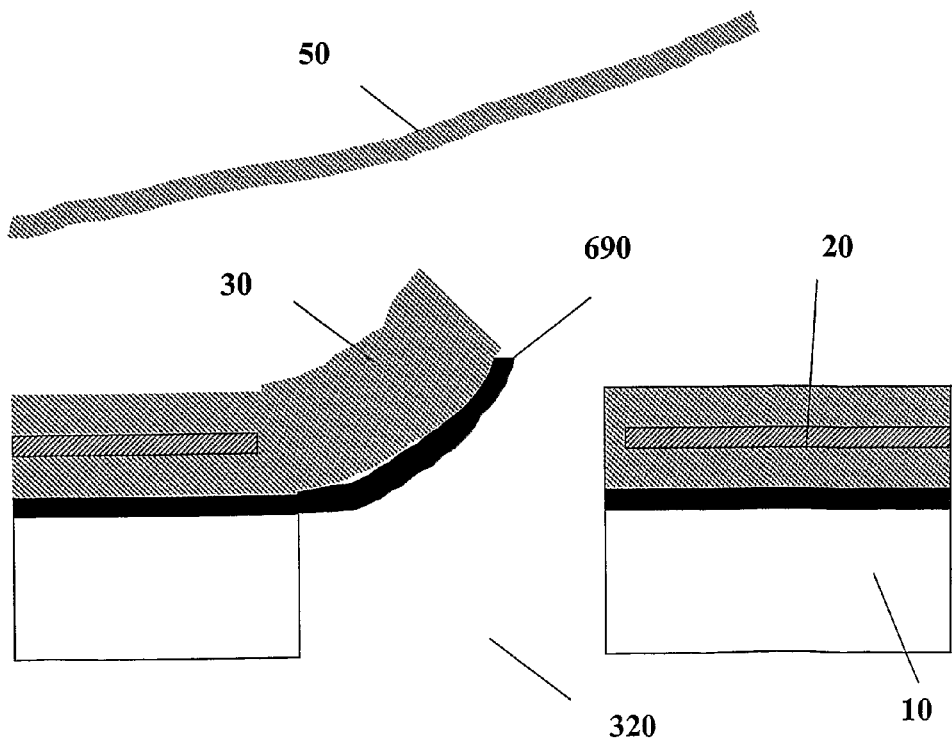
FIG. 6 is a schematic depicting an exploded view of a micromechanical actuator according to the present invention that includes a deflector over the valve opening.

In this embodiment of the present invention, the deflector 590 can be arranged for example as a cantilevered flap extending over the orifice 320; and is mechanically passive (i.e., not electrically driven). As shown illustratively in FIG. 6, the deflector 590 may include a chrome layer 690 arranged between the dielectric layer 30 and the substrate 10. The chrome layer 690 may be patterned to define the lateral dimensions of the deflecting flap 590 over the orifice 320. If the orifice 320 is etched from the substrate 10 side of the fixed composite, the etching of the substrate would stop on the chrome and polyimide films 30 exposed in the orifice 320. An oxygen RIE step, for example, may be used to etch the exposed polyimide film before stopping at the release layer 34.

One process according to the present invention for fabricating the deflector 590 is to evaporate and pattern a Cr layer on top of the silicon substrate using liftoff technology. Then, a polyimide base layer is deposited followed by the deposition and patterning of the bottom electrode and the fixed polyimide insulator covering the bottom electrode. The release layer is deposited and patterned followed by the remainder of the standard process sequence to form the flexible membrane 30 covering the valve opening. After a backside etch of the silicon to form the orifices through the substrate, which will stop on and not etch the Cr or polyimide, an $O_2$ RIE step is performed on the backside to etch the exposed polyimide exposing the release layer. The Cr deflector prevents the etch of the polyimide above the Cr. Once the release layer is etched away, the flaps formed in the flexible membrane are free. The Cr layer 690 and the polyimide layer 30 above the Cr (that was not etched due to the masking by the Cr) act as the deflector 590. The two layers (i.e., the Cr and the polyimide) remain attached to one another. Fabrication of the flexible film flap that covers the valve orifice is unaffected by the fabrication of the deflector.

Figure 7:
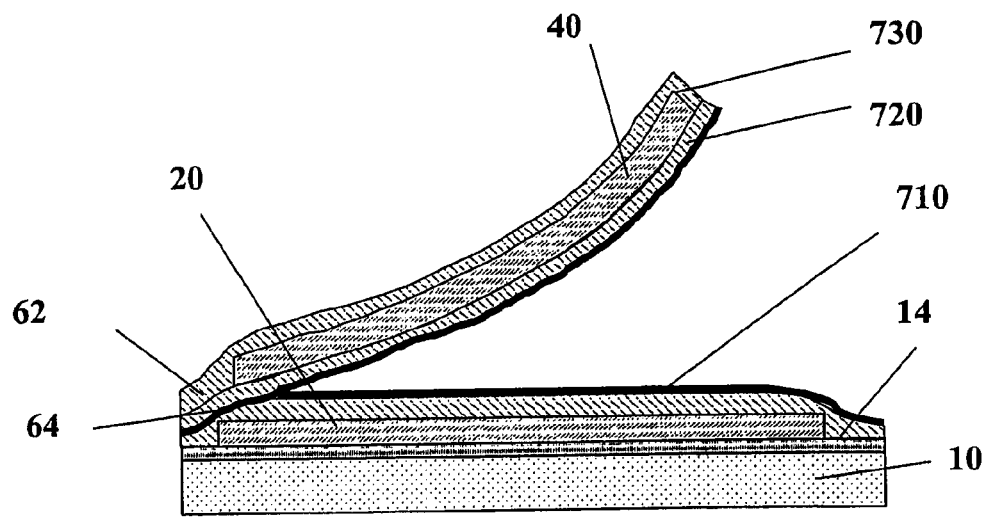
FIG. 7 is a schematic depicting a side view of a micromechanical actuator according to the present invention that includes non-wetting layers on a flexible membrane and a fixed substrate layer.

Another embodiment of the invention, as shown in FIG. 7, prevents stiction of the flexible composite 50 to the fixed composite 130. Stiction can occur during electrical operation (opening and closing) if a fluid or other contaminant is deposited on the actuator surfaces. Stiction will prevent the flexible composite from curling away from the fixed composite when the voltage required to hold the flexible composite flat against the fixed composite is removed. For example, if water or oil wets the surfaces of the flexible and fixed composites, upon removing of the voltage, the flexible composite will not curl away from the fixed composite if the surface tension caused by the intermediate fluid layer is greater than the restoring stress in the flexible composite.

To decrease stiction, this embodiment of the present invention disposes non-wetting layers (e.g., hydrophobic or oleophobic layers) 710, 720, 730 to at least one or more of the top surface of the fixed composite 130, the bottom surface of the flexible composite 50, and the top surface of the flexible composite 50. Alternatively, if a given non-wetting material possesses appropriate dielectric and mechanical properties, or vice-versa, the layers 30, 60, 62 can be replaced by or serve as the non-wetting layers 710, 720, 730.

The non-wetting layers 710, 720, 730 prevent adhesion of the unwanted wetting compound, e.g., water or oil; or cause the compound to form as beads instead of a continuous film. A non-wetting layer is described as a material that increases the contact angle of a fluid deposited on the surface such that the fluid forms droplets or beads on the surface. Preferably the contact angle is greater than 90° for non-wetting characteristics. For low contact angles, fluid will wet or spread over the surface and not form droplets or beads. Wetting behavior can cause stiction of the flexible composite to the fixed composite. For example, if water or oil wets the surfaces of the flexible and fixed composites, upon removing of the voltage, the flexible composite will not curl away from the fixed composite if the surface tension caused by the intermediate fluid layer exceeds the restoring stress (stress which creates the curl) in the flexible composite. If the surfaces are non-wetting and the water or oil beads up, stiction will not occur; furthermore, the opening and closing motion of the actuator (curling and uncurling) may push the fluid beads or droplets out of the active area of the device.

Stiction is particularly prevalent when water or oil is introduced to the environment of an actuator. Accordingly, candidate materials for the present invention include polymers or other suitable materials used for hydrophobic, oleophobic or chemically inert surfaces. More specifically, the polymers can include fluoropolymers (e.g., Teflon®), siloxane polymers (e.g., polydimethylsiloxane or PDMS), and self-assembled monolayers (SAM), e.g. octadecylsilane (ODS), Dichlorodimethylsilane (DDMS), Perfluoro-decyl-trichlorosilane (FDTS). These coatings could be applied according to the present invention to exposed hydrophilic surfaces of the released flapper device, i.e., the fixed dielectric (e.g. polyimide or SiO2) and metal surfaces, so that exposed surfaces become hydrophobic. For example, a polymer may be integrated into the actuator fabrication as an additional spin coated layer; and be photo-defined and etched at the same time as the polyimide layers, because the same etch chemistry may be used (e.g., an $O_2$ plasma). A non-wetting layer may also be applied as monolayer, by applying a diluted polymer solution and spinning off the excess before the polymer layers are cured; e.g., similar to an adhesion promoter process used for photoresist in which the excess adhesion promoter is spun off to leave only a monolayer.

In certain embodiments, the hydrophobic or non-wetting layer would be applied to a released actuator device. This would require a vapor deposited polymer, for example by physical vapor deposition (e.g., evaporation), chemical vapor deposition, spray coating with an atomized spray or dip coating using a very dilute solution.

Alternatively, polymer surfaces could be plasma-treated to alter the wetting behavior of those surfaces. Plasma treatments of polymer surfaces are known in the art as described for example in U.S. Pat. No. 5,147,678, the entire contents of which are incorporated herein by reference. In that case, an additional polymer may not be needed. For instance, surface treatments such as for example fluorine plasmas or chemical plasma treatments (e.g. CF4, $CHF_3$, $SF_6$, and HF) can be used according to the present invention. Further hydrogen plasmas or chemical treatments (e.g. $H_2$, $SiH_4$, $CH_4$, organosilanes) could be used according to the present invention to modify the chemical makeup (by incorporating F or H ions) of the exposed hydrophilic surfaces of the released flapper device to make the exposed surfaces hydrophobic.

Despite the advances described in the present invention or regardless of the use of the above described embodiments, dielectric breakdown in actuators can result from the electric fields generated by the operating voltage of the actuator. Measures to prevent dielectric breakdown may permit an actuator to employ a higher operating voltage. Further, a reduction in dielectric breakdown may both protect and increase the potential applications of an actuator.

Figure 8A:
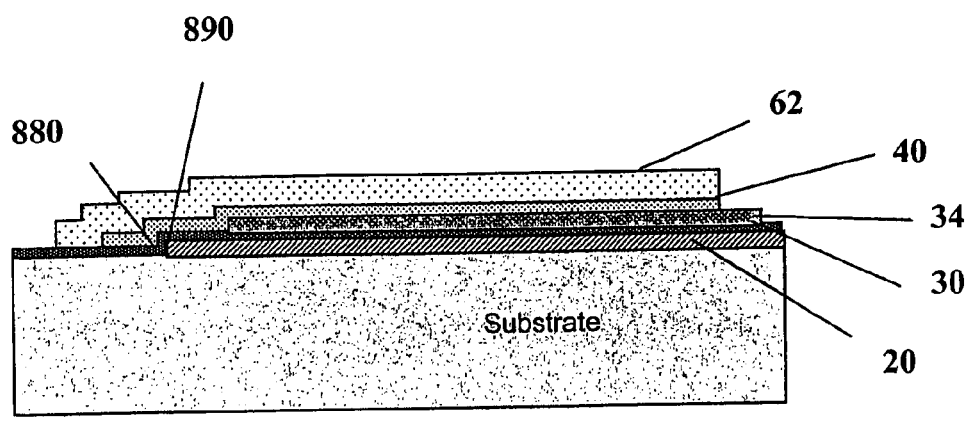
FIG. 8A is a schematic depicting a side view of a conventional micromechanical actuator illustrating local electric field enhancement points.

One embodiment of the present invention addresses dielectric breakdown caused by edges and corners of the fixed and flexible electrodes 20, 40. As shown in FIG. 8A, a stopped configuration of the flexible and fixed electrodes 40, 20 results in respective edges/corners 880, 890. These edges/corners 880, 890 can enhance the local electric field about these corners, as compared to the electric field along the flat surfaces of the electrodes 40, 20. While a dielectric layer 30 is interposed, electric field enhancement can nevertheless lead to dielectric breakdown.

In one embodiment of the present invention, the edges/corners 880, 890 forming the field enhancement points are smoothed to prevent the formation of field enhancement points. One method to smooth the corners is to deposit and pattern in a standard microfabrication technique the bottom electrode, then spin deposit a thin planarizing material that will be thinner over the upper edges of the bottom electrode compared surrounding areas. Then etching with a etch method that has similar etch rates for the planarizing material and the bottom electrode, will remove the upper corner of the bottom electrode before etching any of the surrounding electrode, smoothing it. Alternatively, grey-level lithography as described earlier can also be used to smooth the corners.

Figure 8B:
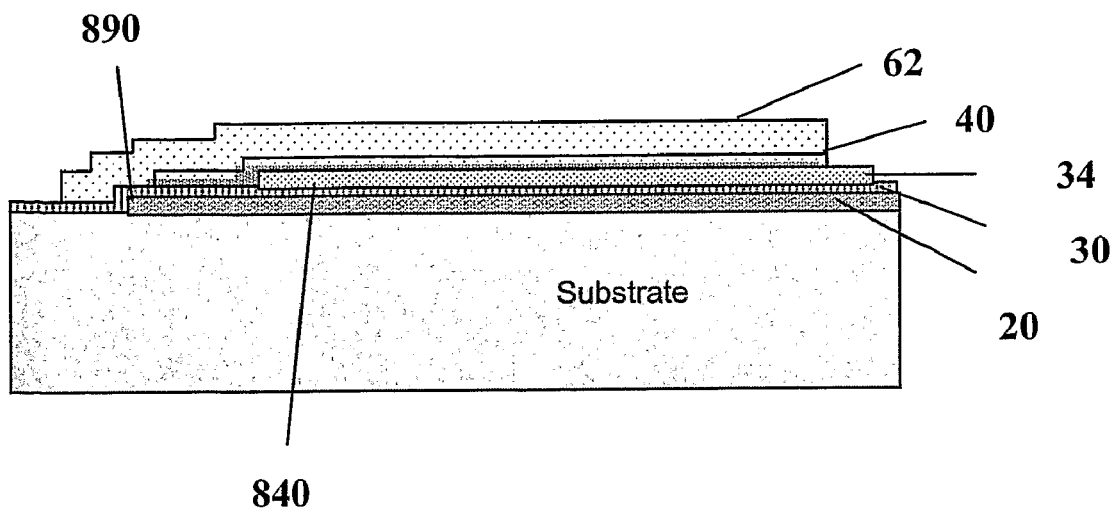
FIG. 8B is a schematic depicting a side view of a micromechanical actuator according to the present invention that displaces the local electric field enhancement points.

In another embodiment of the present invention, as shown in FIG. 8B, the fixed electrode 20 is extended past the flexible electrode 40 in a direction toward the fixed portion 70 of the flexible composite 50. Consequently, the concave edge/corner 880 of the flexible electrode 40 is removed, and the convex edge/corner 890 of the fixed electrode 20 is repositioned, such that the flexible electrode 40 is no longer arranged over the edge/corner 890 of the fixed electrode 20, and the span of the dielectric layer 30 between the distal edges/corners of the electrodes 20, 40 is increased.

Figure 8C:
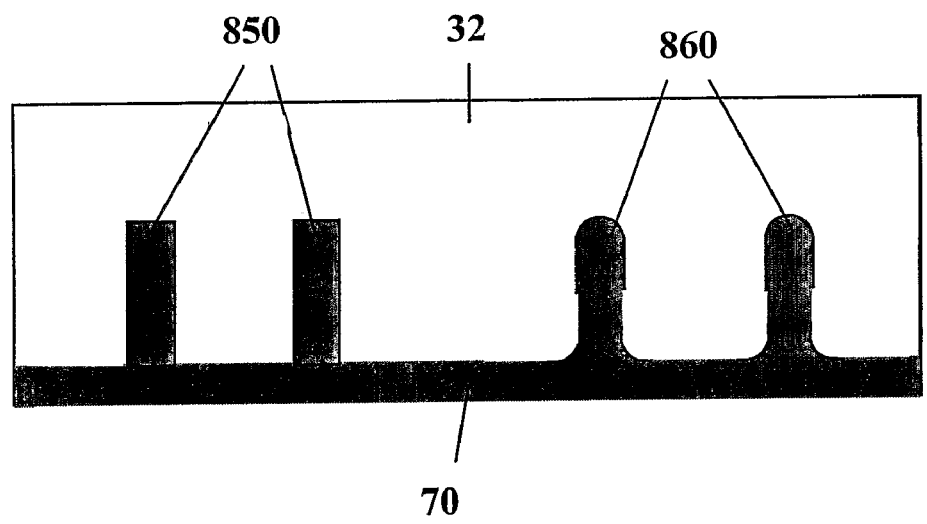
FIG. 8C is a schematic depicting a top view of teeth structures according to the present invention that attach the flexible membrane and a fixed substrate layer.
Figure 9:
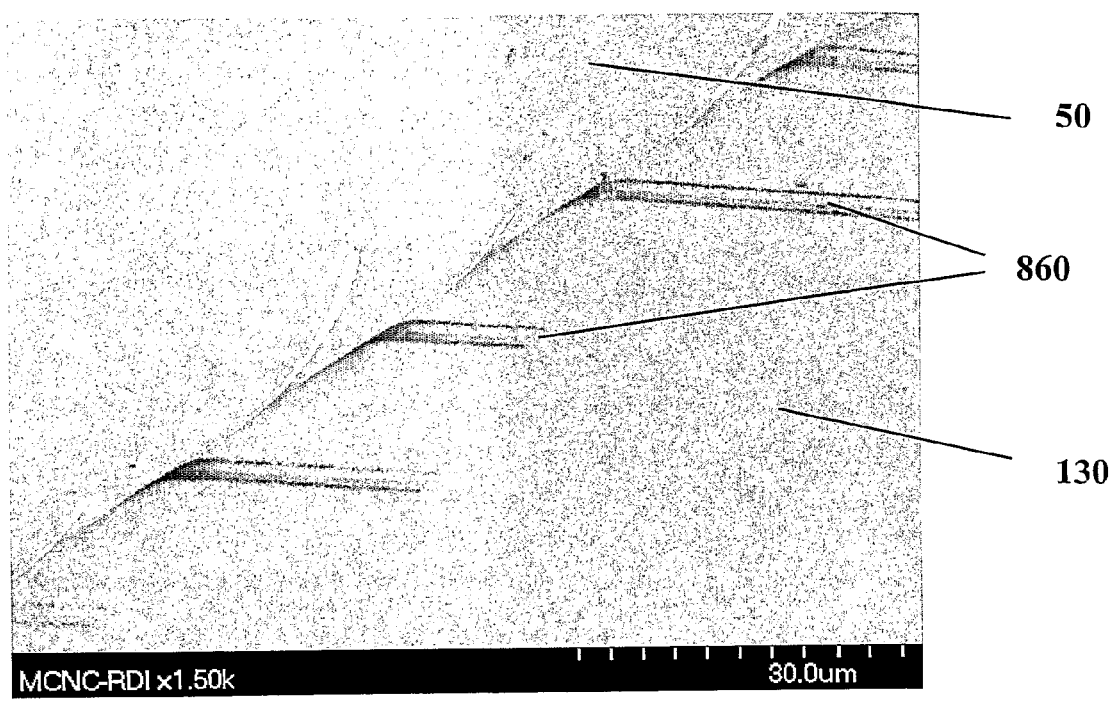
FIG. 9 is a SEM micrograph showing the teeth structures according to the present invention.

Another embodiment of the present invention, as shown in FIG. 8C, addresses dielectric breakdown caused by protrusions or teeth 850 attaching the flexible composite 50 to the fixed composite 130. The teeth are preferably structures formed in the bottom layer of the flexible composite which protrude through the release layer and attach to the dielectric layer of the fixed composite The teeth are formed from the absence of the release layer allowing the flexible composite and fixed composite to be joined in narrow regions that are perpendicular to and adjacent to the fixed region 70. The teeth can control (preferably decrease) the exit angle of the flexible composite 50 from the fixed composite 130. By reducing the exit angle, the operating voltage may be reduced. The teeth 850 define regions of the fixed region 70 that extend into the medial region 80 during fabrication of the actuator. FIG. 9 is a SEM micrograph of a flexible composite 50 in which the flexible composite 50 has been flexed to the point of tearing along a top surface of the teeth. This micrograph shows the relation of the teeth to the flexible composite 50 and the fixed composite 130.

Due to the construction of the flexible composite 130, the flexible electrode 40 effectively goes down into the portions of the teeth, and electrical breakdown may occur at the corners of the teeth. A three-dimensional corner is created where the flexible electrode is closer to the substrate in the teeth regions, and at that corner there is a concentration and increase in the electric field at the corner due to the local geometry. By rounding the corners of the teeth 850 to produce the teeth 860 shown in FIG. 8C, the sharpness of the corner is reduced and the occurrence of dielectric breakdown is also reduced.

Figure 10A:
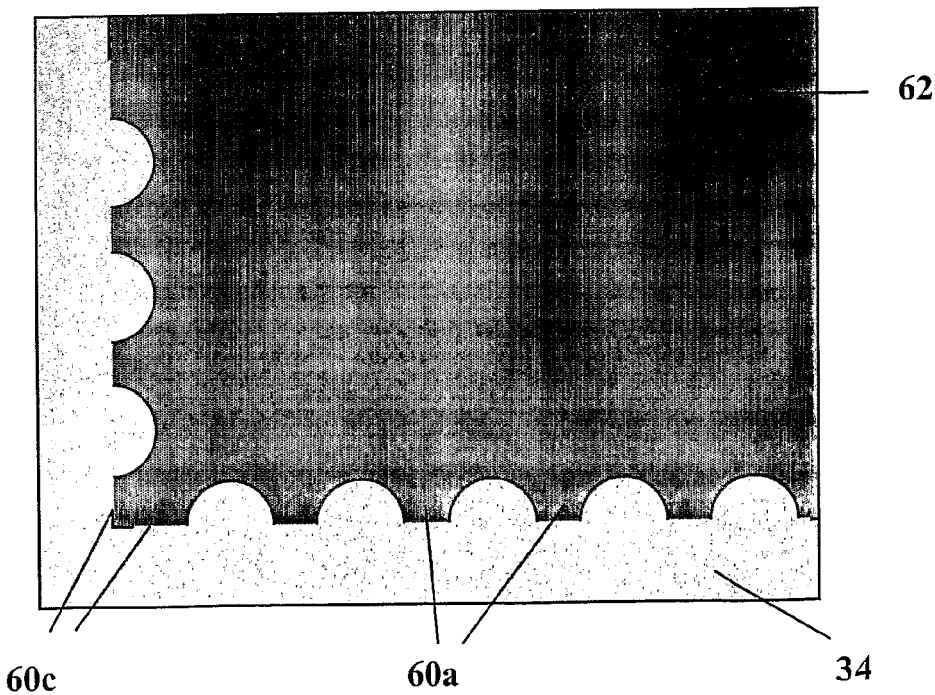
FIG. 10 is a schematic depicting a perspective view of a micromechanical actuator according to the present invention that includes variations on the underside surface of the flexible membrane.

In another embodiment of the present invention, the flexible composite 50 is provided with surface variations such as protrusions and depressions along its outside edge for alleviating one manufacturing problem associated with the MEMS process. FIG. 10A shows a top view of a flexible composite 50 covered with a polyimide. The flexible composite 50 has protrusions 60a along its lateral outside edges 60c. The protrusions 60a are shown as being formed by cylindrical extractions removed from the lateral edge of the flexible composite 50.

At the scale of MEMs devices, forces due to surface properties typically dominate forces due to bulk properties. After a wet etch is completed to release the flexible composite 50 from the fixed composite 130, a rinse to remove the etchant is performed; and then the liquid remaining from the rinse is removed, as well. If the flexible composite 50 is not dried properly, the resultant surface tension can deflect parts of the flexible composite 50 back down toward the fixed composite 130. In other words, even if the flexible composite 50 is to be curled away from the fixed composite 130 after the release etch, the subsequent surface tension forces from the drying can cause the flexible composite 50 to unfurl toward the fixed composite 130 and come into contact with it.

As a result, the flexible composite 50 can push against the fixed composite 130. The resulting stiction between the flexible composite 50 and fixed composite may be strong enough to hold the composites 50, 130 after drying is completed. Approaches to avoiding this problem include the above-noted formation of a non-wetting layers 710, 720 on the dielectric layers 30 and 60; etching the release layer 34 with a dry etch, e.g., gas based RIE; or super-critical drying of the actuator.

Super-critical drying employs the critical point between a fluid's liquid and gas states. By pressurizing a super-critical fluid above its critical point pressure, heating it above the critical point temperature, and then depressurizing the chamber at the elevated temperature, the super-critical liquid is converted to a gas without forming the liquid-gas interface. One non-limiting example of super-critical drying employs $CO_2$ as the super-critical fluid. In this example, the rinsed actuator is taken from a water bath, to an isopropanol bath, and then to a methanol bath. The actuator and some methanol are then placed in a super-critical chamber, where liquid $CO_2$ is added and the chamber purged to leave only $CO_2$ in the chamber. However, super-critical drying is not a perfect process. Thus, the various liquids (e.g., water, isopropanol, methanol, and liquid $CO_2$) may interact differently with the flexible composite 50 surfaces, e.g., polyimide surfaces, to cause the flexible composite 50 to assume different curls and shapes. It has been seen that the curvature of the flexible composite 50 can be reversed in the rinse baths where the flexible composite tries to curl down into the substrate instead of up and away from it. In this case the edges of the flexible composite 50 will be in contact with the fixed composite 130 and the flexible composite will take convex, pillowed shape when viewed from above. This can result in the trapping of rinse fluid under the flexible composite 50 during the super-critical drying process and the trapped liquid can cause stiction of the flexible composite to the fixed composite 130.

Figure 10B:
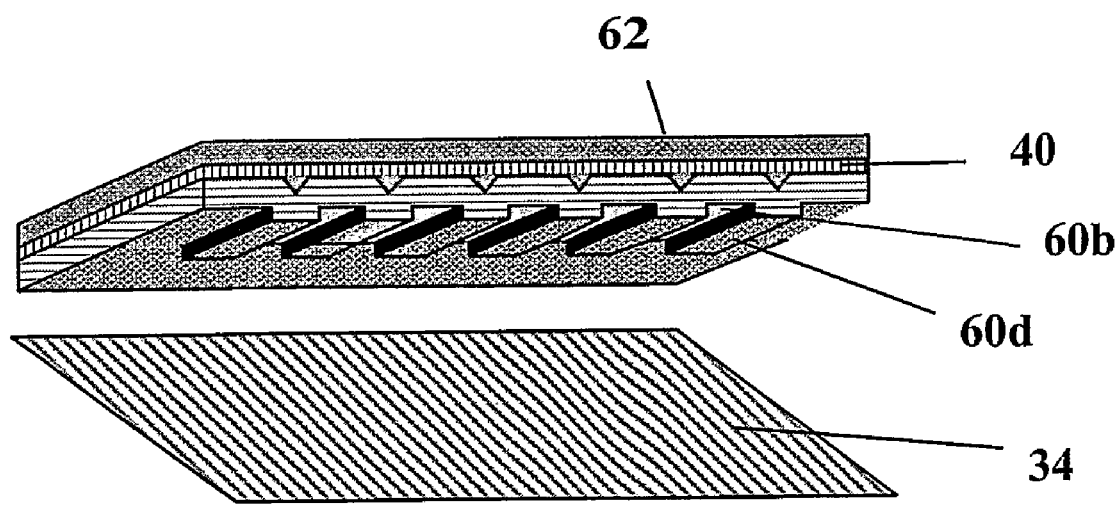

As shown in FIG. 10A, stiction between the fixed composite 130 and the flexible composite 50 can be reduced by the protrusions 60a shown by allowing fluid flow under the contact surface area along the outside edge. Additionally and alternatively, as shown in FIG. 10B, stiction between the fixed composite 130 and the flexible composite 50 can be reduced by arranging variations, e.g., protrusions 60d and depressions 60b, on the contacting surface of the lateral edges. Such variations in the contacting surface of the lateral edges may be formed, for example, by forming different thicknesses of the release layer 34. When the flexible composite 50 is constructed on the release layer 34, these variations are translated to the lateral edge 60c surface. If the flexible composite 50 unfurls during drying, the variations prevent sealing between the lateral edges 60c and the fixed composite 130, thereby allowing the drying agent, e.g., liquid $CO_2$, to access any fluid, e.g., etchant or rinse, under the flexible composite 50. Similar results, i.e., the prevention of a seal between the lateral edge 60c and fixed composite 130 during drying, may be obtained by forming protruding variations 60d in the lateral edge 60c of the flexible composite 50.

Hence, the present invention provides various embodiments for actuators that reduce or eliminate common problems experienced with conventional microactuators. Fabrication of actuators including some or all of the embodiments of the present invention can typically be made using conventional microlithography as detailed in U.S. Pat. No. 6,236,491 described above. Nevertheless, exemplary details of fabrication processes suitable for the present invention are detailed below.

Referring to the figure elements, a substrate 10 defines a planar surface 12 upon which a electrostatic MEMS device can be constructed. In certain embodiments the substrate includes a silicon wafer since the capability of etching high aspect ratio holes through silicon substrates is the most advanced, although any suitable substrate material having a planar surface can be used. Other semiconductors, glass, plastics, or other materials may serve as the substrate 10. To form a deflecting structure, such as the deflector 590, a metal layer such as chromium is deposited and patterned. Chromium layers may also be used for the stiffening members such as for example orifice cap 310. Chromium is preferred because it is not etched by an oxygen RIE step used to define the valve orifice 320 through for example a polyimide. Additionally, chromium provides good adhesion between a polyimide and silicon, and is not attacked by common wet etchants used to remove the release layer. Chromium deposition can be done with evaporation and patterned using liftoff lithography.

In some embodiments of the present invention, an insulating layer 14 overlies the planar surface of the substrate 10 and provides electrical isolation. The insulating layer 14 in certain embodiments includes a non-oxide based polymer, such as polyimide. In certain embodiments, oxide based insulators cannot be used if certain acids are used in processing to remove the release layer. Other insulators, even oxide based insulators, may be used if release layer materials and compatible acids or etchants are used for removing the release layer. For instance, silicon dioxide could be used for the insulating layers if etchants not containing hydrofluoric acid are used. The insulating layer is formed by depositing a suitable material on the planar surface of the microelectronic substrate. Polyimide can be deposited using a spin coating process and patterned by etching the film in an oxygen RIE plasma. Alternatively, a photoimageable polyimide material can be deposited and patterned by UV exposure.

In some embodiments of the present invention, the substrate electrode 20 is disposed as a generally planar layer affixed to the surface of the underlying insulating layer 14. In certain embodiments, the substrate electrode 20 includes a gold layer deposited on the top surface of the insulating layer 14. A thin layer of chromium may be deposited onto the substrate electrode 20 to allow better adhesion to the substrate. Alternatively, other metallic or conductive materials may be used so long as these materials are not eroded by release layer processing operations. Cr and Au films can be deposited by evaporation and patterned using liftoff lithography. The surface area and shape of the substrate electrode 20 can be varied as required to create the desired electrostatic force.

In some embodiments of the present invention, a second insulating layer 30 can be deposited on the substrate electrode 20 to electrically isolate the substrate electrode 20 and prevent electrical shorting to the flexible electrode 40. The second insulating layer can be provided as a dielectric layer having a predetermined thickness between the substrate electrode 20 and the flexible composite 50. The second insulating layer 30 in certain embodiments includes polyimide, although other inorganic dielectric insulators or polymers tolerant of release layer processing may also be used. The second insulating layer 30 can be a generally planar surface 32.

A release layer is utilized in the present invention to construct from for example the fixed composite 130 the upper structure of the flexible composite 50. The release layer 34 is first deposited on the planar surface 32 in the area underneath the medial 80 and distal 100 portions of the overlying flexible composite 50. The release layer is only applied to areas below the flexible composite portions not being affixed to the underlying planar surface. In certain embodiments, the release layer includes an oxide or other suitable material that may be etched away when acid is applied thereto. The release layer may also be deposited with or etched to a reduced thickness near the medial portion 80 of the flexible composite 50 thus reducing the resulting gap 120 when the release layer is etched away, thus forming a stepped surface.

After the overlying layers have been deposited, the release layer is removed typically through standard microfabrication acidic etching techniques, such as a hydrofluoric acid etch. When the release layer has been removed, the medial and distal portions of flexible composite 50 are separated from the underlying planar surface 32, creating the air gap therebetween. In certain embodiments, the release layer is $SiO_2$ deposited by PECVD. The release layer is patterned with a photoresist masking layer, and either a wet HF or other acidic etch or a RIE etch is utilized to dissolve the $SiO_2$. The formation of a stepped surface at the anchor or troughs around the perimeter of the flexible composite 50 is similarly done with a photoresist masking layer and either a wet HF etch or other acidic or a RIE etch.

The layers of the flexible composite 50 generally overlie planar surface 32 and, prior to removal, the release layer. The layers are arranged and shown vertically, while the portions are disposed horizontally along the flexible composite. Known integrated circuit manufacturing processes can be used to construct the layers including the flexible composite 60. A first layer of polymer film 60 is applied to the release layer and exposed areas of planar surface 32. Polyimide can be used for the first layer of polymer film, although other flexible thin films including polymers or inorganic materials compatible with release layer processes may be used. At a minimum, two layers can form the flexible composite 50: a first layer of polymer film 60 and a second layer of a flexible electrode 40. Alternatively, the minimum two layers could include a first layer of flexible electrode 40 and a second layer of a polymer film 62. The flexible composite 50 can include all three of these layers.

Flexible electrode 40, having a layer of flexible conductor material, is deposited overlying the first layer of polymer film 60. Flexible electrode 40 in certain embodiments includes gold, although other acid tolerant yet flexible conductors such as conductive polymer film may be used. The surface area or configuration of flexible electrode 40 can be varied as required to create the desired electrostatic force or vary it as a function of the distance from the inflection point 105.

In some embodiments of the present invention, a second layer of flexible polymer film 62 can be applied over the flexible electrode layer 40. Alternatively, a thin layer of chromium may be deposited onto the flexible electrode layer to allow better adhesion to the layered polymer films. Wherever a gold layer is used, chromium can be applied if necessary to improve the adhesion of gold to the adjacent materials. Typically, the polymer films are flexible and have a different thermal expansion coefficient than the electrode layer 40. Because the electrode layer 40 (and biasing layer 110 if included) and the polymer films of the flexible composite expand at different rates, the flexible composite curls towards the layer having the higher thermal expansion coefficient. In certain embodiments, polyimide is used as the biasing layer and is deposited with a spin coating process.

Stiffening layers over the valve orifices 320 can be formed by depositing a metal film on top of the polymer layer 62. The metal in certain embodiments of the present invention can be gold with a chromium adhesion layer deposited by evaporation and patterned with liftoff technology. Other metals or material can be used, provided these metals have the appropriate mechanical strength and stiffness as well as chemical resistance to the release etch.

After completion of the flexible composite 50, the next step typically involves the formation of the valve orifice 320 through the substrate. Using a photoresist mask applied to the back side of the substrate, a deep silicon RIE is done to etch through to the substrate 10 and stopping on the insulating layer 14 or the deflector 590. Etching can then be continued with an oxygen RIE, again etching from the backside until the release layer is exposed. Then the release layer can be etched with a wet HF etch to free the flexible composite film from the substrate.

The substrate can then be rinsed and dried in a supercritical dryer to avoid stiction of the flexible film to the substrate. A hydrophobic surface treatment can then be applied either of the exposed surfaces by coating with a polymer material or by modifying the exposed surfaces with a plasma or chemical treatment to create hydrophobic properties. The hydrophobic surface allows the device to operate in the presence of fluid contamination introduced through the valve orifice. The hydrophobic surface treatment prevents stiction between the flexible composite portion and the substrate caused by deposition of fluid on the exposed surfaces.

As noted above, electrostatic actuators have a number of applications including applications as optical shutters, radio frequency phase shifters, choppers for infrared detectors, microactuators, electrical switches, valves, and variable radio frequency capacitors. The various embodiments of the present invention individually or in combination can be applied to these applications.

Figure 11A:
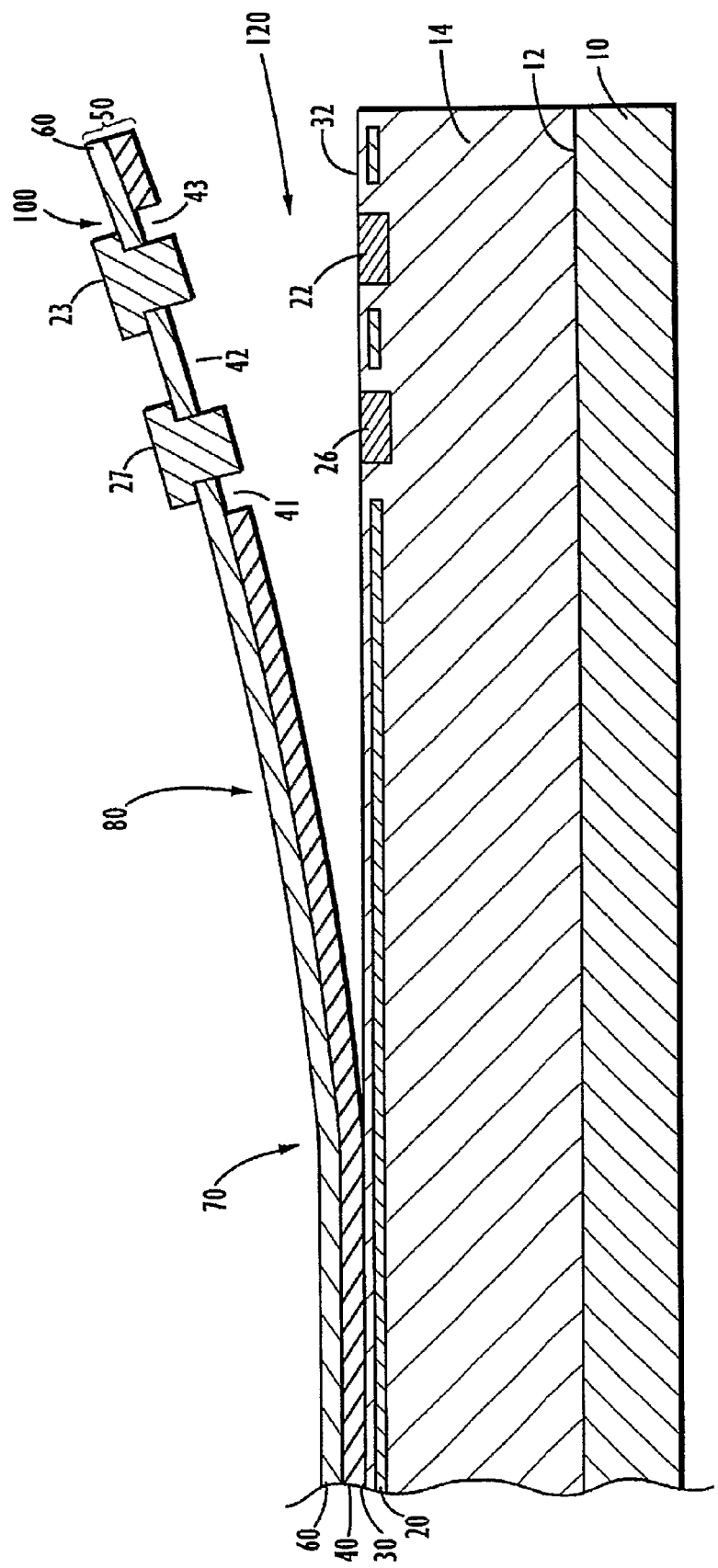
FIG. 11A is a schematic depicting a side view of a micromechanical actuator according to the present invention that includes electrical switch contacts contacted by the micromechanical actuator.

One example of such an application includes utilizing the actuators of the present invention for electrical switches with an overdrive structure in an electrical relay. In this application, one contact is provided on an underside of the flexible composite 50 and another contact is provided on a surface of the fixed composite 130. As shown in FIG. 11, the two contacts 22 and 26 are placed so that when the flexible film is brought down to the substrate, the contacts 22 and 26 contact switches 23 and 27, respectively. If the release film between the contacts is the same thickness as surrounding the contacts, when the release film is etched out and the contacts close, the best that the contacts can do is to just meet and the contact surfaces do not have a strong closing force since the actuation electrodes only surround the contacts. By thinning the release film over the contact area, (either the entire area or portions of the area) when the flexible film is brought down to the substrate, the contacts will touch together first and then the surrounding electrode area will touch. This transfers some of the closing force from the actuating electrodes to the contact area resulting in better electrical contact and lower resistance.

Another example includes actuator devices according to the present invention containing orifices in the fixed composite for use as gas or fluid valve devices (see for example the orifices shown in FIGS. 3, 4A, and 4B). Valve devices can be formed by etching orifices with high aspect ratio through the fixed composite (for example a silicon wafer using deep RIE). Other substrates that could be used for the fixed composite include glass, quartz or plastic substrates. Besides deep RIE, orifices in the fixed composite could also be formed by chemical etching or laser drilling. Electrostatic actuation of the valve device allows control of fluid or gas flow, where sealing of the flexible composite against the fixed composite prevents gas or fluid flow through the orifice (i.e., closes the valve).

Figure 11B:
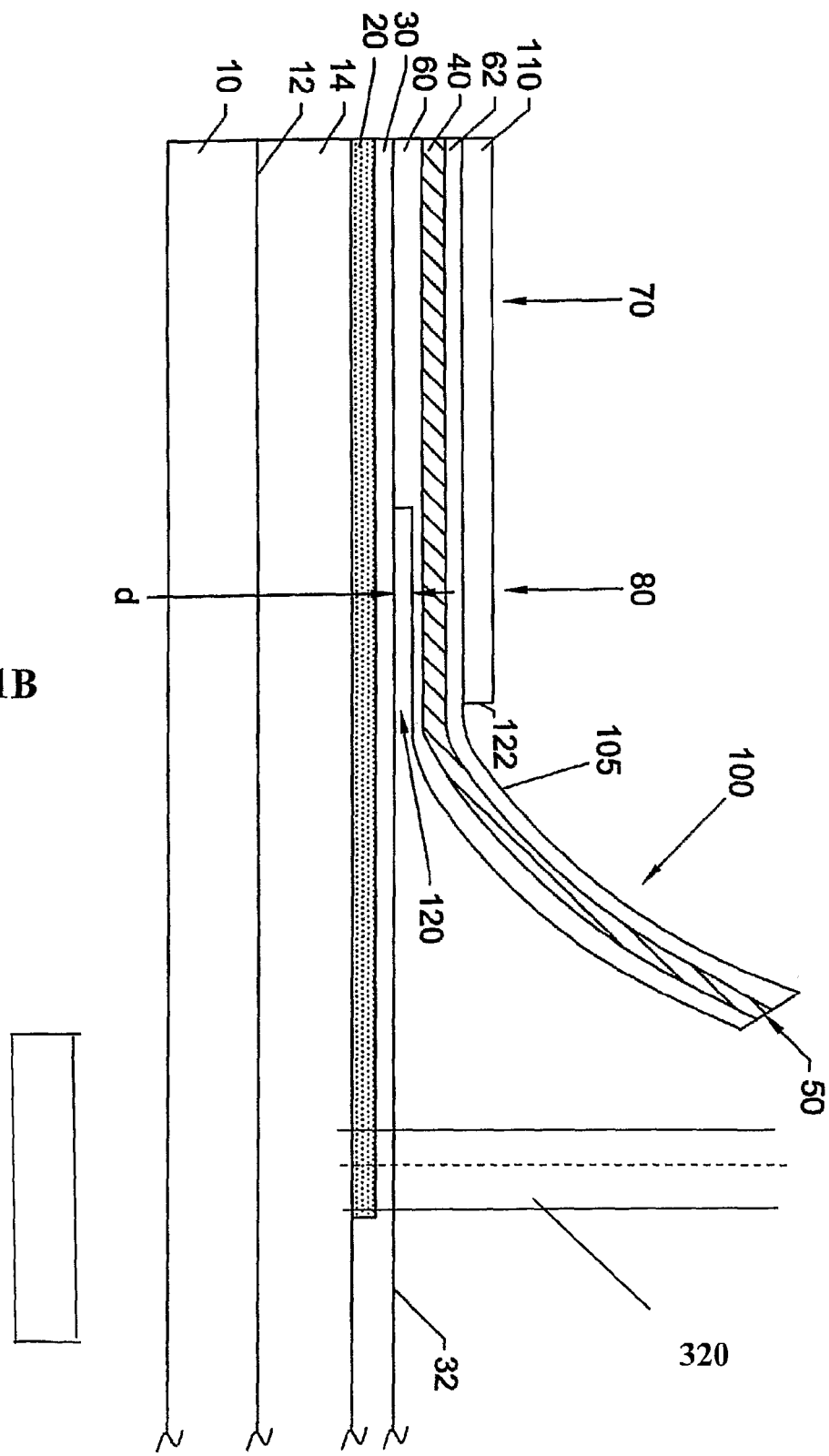
FIG. 11B is a schematic depicting a side view of a micromechanical actuator according to the present invention that forms an optical activated by the micromechanical actuator.

Other applications for the present invention include optical switches, shutters or choppers for modulating electromagnetic radiation. For optical switches, electromagnetic radiation can be modulated by changing the angle of reflection off of the top surface of the flexible composite. When the electrostatic actuator is flattening against the fixed composite by applying voltage to the electrodes, depending on the angle of incidence the radiation will be reflected off of the electrostatic actuator at a different angle compared to when the actuator is curled with no voltage applied. Such a device may be used in micromirror arrays for optical switches. Additionally and alternatively, the flexible membrane includes a material that is light absorbing (added or inherent due the electrode materials). As such, light directed through for example an orifice will be shuttered off when the flexible membrane covers the orifice. FIG. 11B is a schematic depicting a side view of a micromechanical actuator according to the present invention that forms an optical activated by the micromechanical actuator. Elements 325a and 325b represent respectively an optical source or an optical detector which transmit or receive light through the optical channel 320.

For instance in shutters or choppers, the electromagnetic radiation may be passed through a transparent fixed composite (in which the optical channel 320 constitutes the entire substrate). The choice of transparent substrate for the fixed composite depends on the wavelength of the electromagnetic radiation. For example, quartz could be used for transmission of UV or visible radiation, glass could be used for visible radiation, and sapphire, ZnS, Si or Ge could be used for IR radiation. For this application, flattening the flexible composite by applying voltage to the electrodes causes reflection of the radiation, whereby curled actuators with no applied voltage allow radiation to pass through the substrate. Individual devices or arrays of shutters or choppers could be used or integrated with (for example by flip-chip solder bumping) any electromagnetic radiation detector requiring such a modulator, such as a CCD array, HgCdTe infrared detector, Si, GaAs or other semiconductor photodiode for UV or IR, or uncooled pyroelectric or microbolometer infrared detectors.

Numerous modifications and variations of the present invention are possible in light of the above teachings. It is therefore to be understood that within the scope of the appended claims, the invention may be practiced otherwise than as specifically described herein

The invention claimed is:
1. An electrostatic actuator comprising:
 a base including a first electrode;
 a flexible membrane including at least two material layers of different materials in contact with each other, at least one of the material layers including a second electrode electrically isolated from the first electrode;
 a gap separating the flexible membrane from the base;
 the flexible membrane including,
 a fixed end connected to the base, and
 a free end opposite the fixed end and spaced apart from the base;
 said free end of the flexible membrane configured to move relative to the base under an electrostatic force; and
 said second electrode having at least first and second portions separated by a third portion and
 in combination the first, second, and third portions defining a first step and a second step provided in a vicinity of said fixed end, and in combination forming a reduced gap space between the base and the flexible membrane, when no pull down voltage is applied, and thereby to reduce a pull-down voltage needed to pull down the flexible membrane from an open no applied voltage position to a closed position,
 wherein
 said first step is adjacent to the fixed end and said second step is adjacent to the first step,
 the first step is closer to the fixed end than the second step,
 the first portion comprises said fixed end connected to the base, and
 the third portion is separated from the base by the reduced gap space.
2. The actuator according to claim 1, wherein within the flexible membrane the second electrode transitions across the first and second portions in a continuous manner.

3. The actuator according to claim 1, further comprising:
a non-wetting compound disposed on at least one of an upper surface of the flexible membrane, a lower surface of the flexible membrane, and an upper surface of the base.

4. The actuator according to claim 1, wherein the first electrode extends past an end of the second electrode in a direction defined toward the fixed end.

5. The actuator according to claim 1, further comprising:
a stiffening member disposed on the flexible membrane away from the fixed end of the flexible membrane.

6. The actuator according to claim 1, wherein the base comprises a substrate, a first insulating layer disposed on the substrate, said first electrode disposed on the first insulating layer, and a second insulating layer disposed on the first electrode.

7. The actuator according to claim 1, wherein the flexible membrane further comprises:
a mechanical biasing member extending from the fixed end onto a part of the free end not attached to the base and configured to stress the flexible membrane.

8. The actuator according to claim 1, further comprising:
a first electrical contact on the flexible membrane;
a second electrical contact on the base; and
said first and second electrical contacts forming opposed contacts of an electrical switch controlled by movement of the flexible membrane.

9. The actuator according to claim 1, further comprising:
an orifice extending through the base; and
said flexible membrane having a sealing surface configured to cover said orifice; and
said flexible membrane and said base comprising a valve controlled by movement of the flexible membrane.

10. The actuator according to claim 1, wherein
said flexible membrane comprises at least one of a light-absorbing material and a light-reflecting material, and
the flexible membrane and the base forming an optical switch activated by movement of the flexible membrane.

11. The actuator according to claim 10, further comprising:
a light source configured to direct light along a surface of the flexible member,
said light to be reflected by the light-reflecting material of the flexible membrane.

12. The actuator according to claim 10, further comprising:
a light source configured to direct light through the base,
said light to be absorbed by the light-absorbing material of the flexible membrane.

13. The actuator according to claim 1, further comprising:
a radiation detector configured to detect electromagnetic radiation;
wherein said flexible membrane comprises a cover shielding the electromagnetic radiation from the radiation detector.

14. The actuator according to claim 13, wherein the flexible membrane comprises plural flexible membranes and the radiation detector is configured to detect the electromagnetic radiation at an array of points.

15. The actuator according to claim 14, wherein the radiation detector comprises a plurality of radiation detectors.

16. The actuator according to claim 1, wherein:
a polymeric non-wetting compound is disposed on at least one of a lower surface of the flexible membrane and an upper surface of the base to form at least one exposed surface of the polymeric non-wetting compound to prevent stiction of the flexible membrane to the base.

17. The actuator according to claim 16, further comprising:
a stiffening member disposed on the flexible membrane away from the fixed end of the flexible membrane.

18. The actuator according to claim 16, wherein the base comprises a substrate, a first insulating layer disposed on the substrate, said first electrode disposed on the first insulating layer, and a second insulating layer disposed on the first electrode.

19. The actuator according to claim 16, wherein the flexible membrane further comprises:
a mechanical biasing member extending from the fixed end onto a part of the free end not attached to the base and configured to stress the flexible membrane.

20. The actuator according to claim 16, further comprising:
a first electrical contact on the flexible membrane;
a second electrical contact on the base; and
said first and second electrical contacts comprising an electrical switch controlled by movement of the flexible membrane.

21. The actuator according to claim 16, further comprising:
an orifice extending through the base; and
a sealing surface on at least one of the flexible membrane and the base; and
said flexible membrane and said base comprising a valve controlled by movement of the flexible membrane.

22. The actuator according to claim 16, wherein
said flexible membrane comprises at least one of a light-absorbing material and a light-reflecting material, and
the flexible membrane and the base forming an optical switch activated by movement of the flexible membrane.

23. The actuator according to claim 22, further comprising:
a light source configured to direct light along a surface of the flexible member,
said light to be reflected by the light-reflecting material of the flexible membrane.

24. The actuator according to claim 22, further comprising:
a light source configured to direct light through the base,
said light to be absorbed by the light-absorbing material of the flexible membrane.

25. The actuator according to claim 16, further comprising:
a radiation detector configured to detect electromagnetic radiation;
wherein said flexible membrane comprises a cover shielding the electromagnetic radiation from the radiation detector.

26. The actuator according to claim 25, wherein the flexible membrane comprises plural flexible membranes and the radiation detector is configured to detect the electromagnetic radiation at an array of points.

27. The actuator according to claim 26, wherein the radiation detector comprises a plurality of radiation detectors.

* * * * *